Dec. 29, 1936.  S. T. EDEL ET AL  2,065,854
FISH BAIT SINKER
Filed May 29, 1936
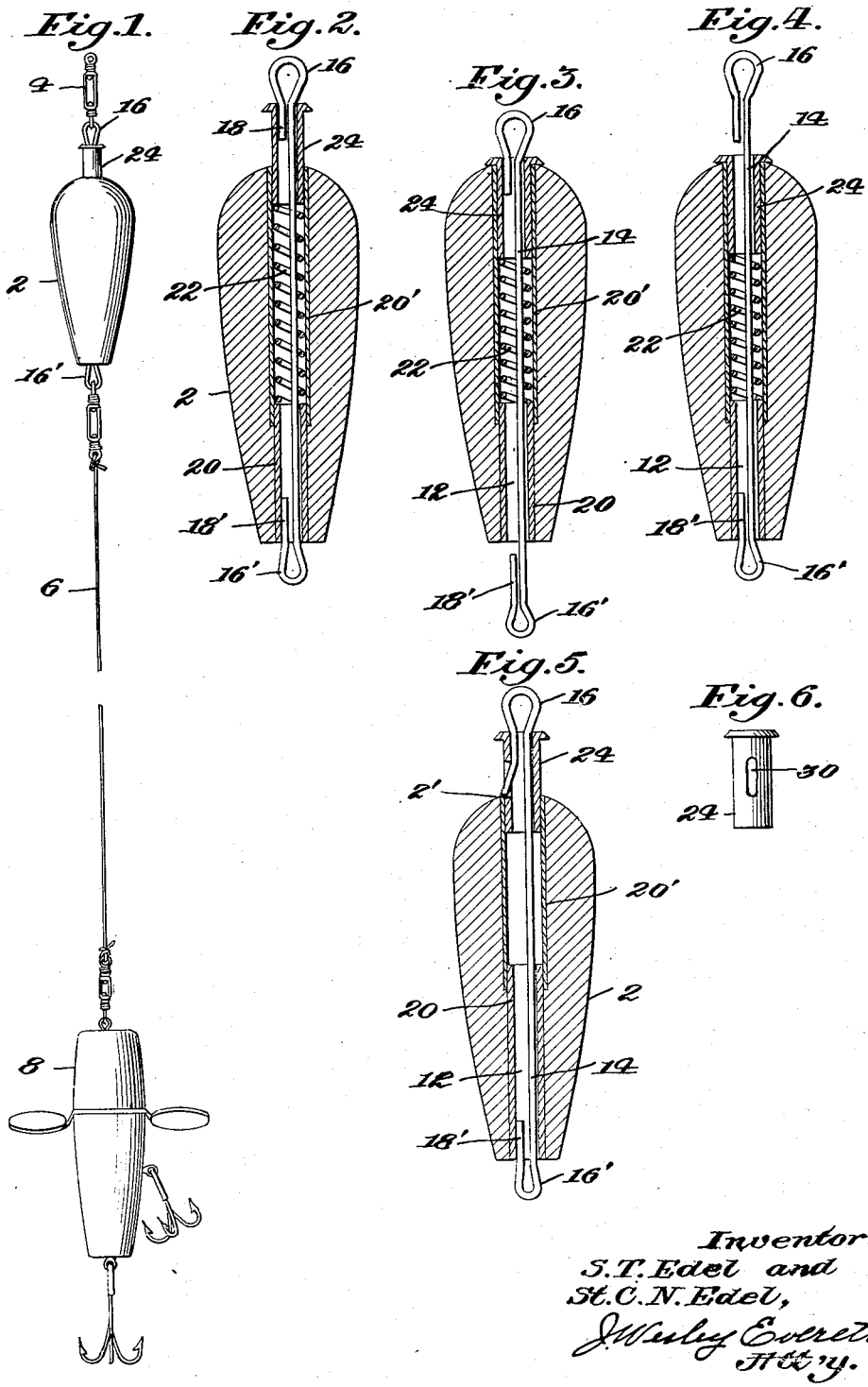
Inventors:
S. T. Edel and
St. C. N. Edel,
J. Wesley Everett
Att'y.

Patented Dec. 29, 1936

2,065,854

UNITED STATES PATENT OFFICE 2,065,854

FISH BAIT SINKER

Samuel T. Edel, Middle River, and St. Clair N. Edel, Baltimore, Md.

Application May 29, 1936, Serial No. 82,612

3 Claims. (Cl. 43—52)

The present invention relates to sinkers and more particularly to a sinker for use with a fishing line in which the sinker is normally carried between the line and bait leader.

One object of the invention is to incorporate with the sinker improved securing means by which the fishing line and bait leader may be attached thereto, which will eliminate the necessity of knotting or tying the lines to the sinker, as is now the customary practice.

Another object is to provide the securing means with an improved closing means, which will permit the sinker to be easily and quickly removed or placed as the case may be.

With these and other objects in view which will appear hereinafter, the invention consists of certain novel features, which will be more fully described in their preferred forms in the accompanying drawing, in which like numerals are employed to designate like parts throughout the same:

Fig. 1 is a view in elevation showing the sinker and the attached bait.

Fig. 2 is a longitudinal sectional view through the sinker, showing the fastening means in closed position.

Fig. 3 is a view similar to Fig. 1, showing one end of the fastening means in open position.

Fig. 4 is also another view similar to Fig. 1 in which the opposite end of the fastening means is in open position.

Fig. 5 is a modified form of closing means.

Fig. 6 is a view in elevation of the sleeve 24 as used with the modified form shown in Fig. 5.

The sinker is designed to have one end attached to the fishing line, or swivel 4, which is in turn attached to the line and the other end attached to the leader 6 which has attached thereto at a convenient distance a fishing bait 8.

The preferred form is shown in Figs. 2-4 and comprises, a body portion 2 having substantially centrally located therethrough a longitudinal opening 12. Extending through and somewhat longer than the opening is a shaft 14, the opposite ends of which are turned to provide eyelets 16 and 16'. The eyelets are larger than the opening 12 and provide stopping means for limiting the longitudinal movement of the shaft through the opening. The returned ends 18 and 18' after forming the eyelets extend for a short distance along the shaft 14. The opening 12 is designed to receive these turned end portions, which are of such length that they will clear the opening 12 when the shaft is extended its full length in the direction of the eyelet to be opened.

The opening 12 has preferably a lining 20 and 20' in the form of tubes around which the body portion 2 is formed, one of the said tubes being slightly smaller than the other. Within the larger of the tubes 20' there is provided a coil compression spring 22, which rests upon the upper end of the smaller tube. Surrounding one end of the shaft 14 and slidable within the tube 20', is a sleeve 24, into which the bent end portion 18 of the shaft is also receivable. The coil spring 22 is compressed by the sleeve 24, which normally holds the sleeve in an outward position against the eyelet 16. This action of the spring extends the shaft through the opening 12 in the direction of the sleeve and brings the member 18' into the opposite end of the tube to close the eyelet 16', as shown in Fig. 2.

In order to open the eyelets the shaft is pressed downwardly as shown in Fig. 3, compressing the spring 22 until the portion 18' has been disengaged from the opening 12. When in this position the loop formed in the end of the leader can easily be inserted into the eyelet 16'. When the shaft is released the portion 18' is moved by the action of the spring 22 into the opening 12, closing the eyelet. In order to open the eyelet 16 the sleeve 24 is pressed downwardly into the opening 12 against the spring 22. In this operation the shaft 14 is not moved with the sleeve and therefore the sleeve moves from over the member 18 and the eyelet 16 is open as shown in Fig. 4 and in position to receive the loop or swivel of the fishing line. When the sleeve is released it is again forced up over the member 18 by the spring 22 closing the eyelet 16.

Referring again to the modified form as shown in Figs. 5 and 6, the structure does not include the compression spring 22 but the sleeve 24 has an opening 30 through which the lower end of the member 18 is extended to bear against the body portion of the sinker at 2', for retaining the shaft and sleeve in position when the eyelets are closed.

In order to insert the leader and line loops into the eyelets, the member 18 is compressed into the opening within the sleeve 24 until the sleeve is slidable over the extended member 18. The sleeve is then moved inwardly similar to the position shown in Fig. 4. When the sleeve is in this position the eyelet 16 is open. The shaft 14 also is slidable through the opening 12 for opening the eyelet 16' similar to that shown in Fig. 3. To close the eyelets the sleeve is moved outwardly until the member 18 registers with the slot 30 in the sleeve, the shaft 14 is also moved in the direction of the sleeve until the portion 18 is in position to bear against the outer top portion of the sinker. The slot 30 will keep the sleeve 24 in position to maintain the eyelet 16 closed and the member 18 bearing against the body of the sinker at 2' will keep the shaft 14 extended in the direction of the sleeve, thereby keeping the eyelet 16' also in closed position.

In use the sinker is drawn through the water in the direction of the sleeve causing the pressure against the sinker due to resistance of the water to be against the eyelet 16', which is held closed by the opening 12.

While I have described my invention, referring to certain details of construction as well as form of the same it is for illustration only and I do not wish to be limited thereto except as may be pointed out in the following claims:

I claim:

1. A sinker weight for fishing bait, comprising a body portion having an opening extending therethrough, a shaft extending through said opening, open eyelets formed on the ends of said shaft, each having a returned end portion, one of said eyelets being adapted to be closed by having the returned end portion inserted in the opening in one end of the sinker, a sleeve slidable within said opening for closing the other eyelet, and means for positioning the said shaft and sleeve for maintaining both the eyelets in closed position and operative to allow for the movement of said shaft and sleeve for opening said eyelets.

2. A sinker weight for fishing baits comprising a body portion having an opening extending therethrough, a shaft extending through said opening, open eyelets formed on the ends of said shaft, each having a returned end portion, one of said eyelets being adapted to be closed by having the returned end portion inserted in the opening in one end of the sinker, a sleeve slidable within said opening for closing the other said eyelet, and spring means for positioning the said shaft and sleeve for normally maintaining the eyelets in closed position and operative to allow for the movement of said shaft and sleeve for opening said eyelets.

3. A sinker weight for fishing baits comprising a body portion having an opening extending therethrough, a shaft extending through said opening, open eyelets formed on the ends of said shaft, each having a returned end portion, one of said eyelets being adapted to be closed by having the returned end portion inserted in the opening in one end of the sinker, a sleeve slidable within said opening for closing the other eyelet, and means for locking the said sleeve when the eyelets are in closed position and operative to allow said sleeve to slide within said opening to open said eyelets.

SAMUEL T. EDEL.
ST. CLAIR N. EDEL.